F. A. GILFUS.
TESTING DEVICE FOR AIR BRAKE SYSTEMS.
APPLICATION FILED JUNE 4, 1909.
982,714.
Patented Jan. 24, 1911.
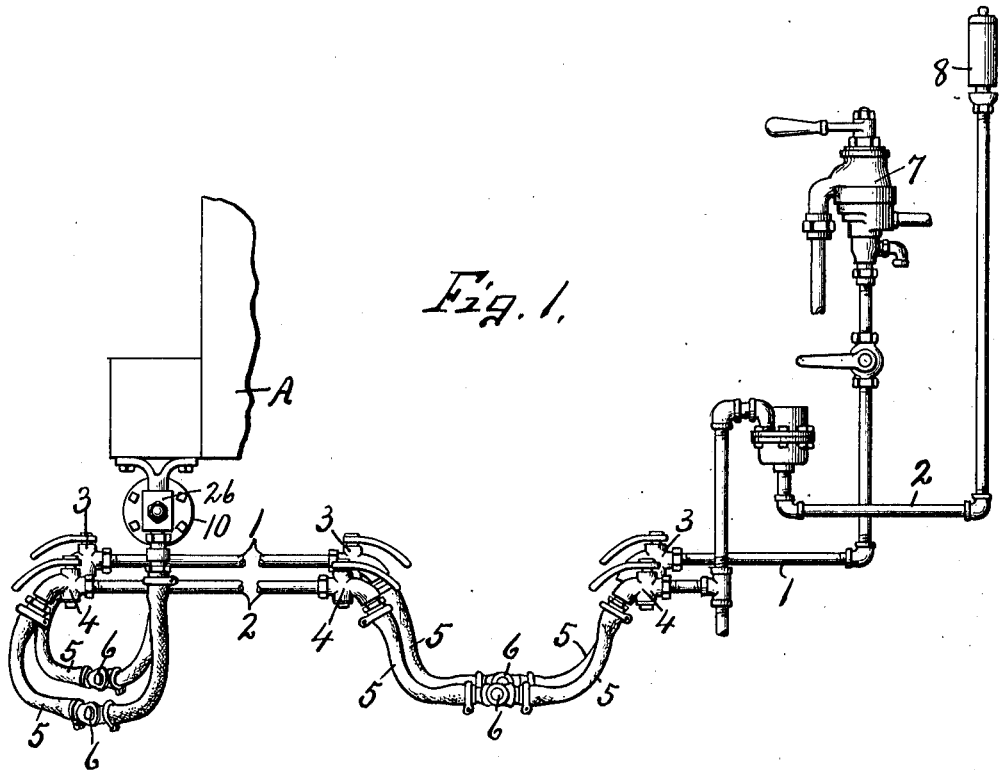
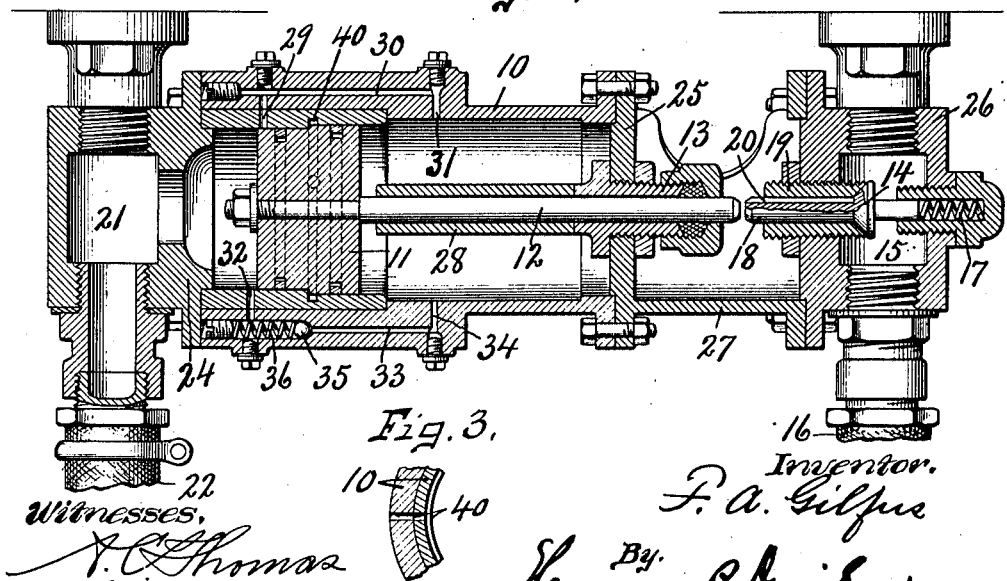
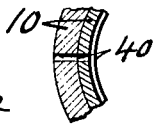

UNITED STATES PATENT OFFICE.

FRED A. GILFUS, OF AUBURN, NEW YORK.

TESTING DEVICE FOR AIR-BRAKE SYSTEMS.

982,714. Specification of Letters Patent. Patented Jan. 24, 1911.

Application filed June 4, 1909. Serial No. 500,175.

*To all whom it may concern:*

Be it known that I, FRED A. GILFUS, of Auburn, in the county of Cayuga, in the State of New York, have invented new and useful Improvements in Testing Devices for Air-Brake Systems, of which the following, taken in connection with the accompanying drawings, is a full, clear, and exact description.

This invention relates to a testing device for air brake systems, adapted to be controlled from the cab of the engine to enable the engineer to determine whether or not any one or more of the angle cocks in the train pipe and signal pipe throughout the train is or are closed.

My main object is to equip the end of each car with such a testing device and to provide each of the testing devices with separate hose and couplings whereby they may be connected to the corresponding hose couplings on the adjacent ends of the brake pipe and signal pipe so that when the cars are assembled to form the train and the couplings for the brake pipe and signal pipe are connected in the usual manner, the hose couplings on the rear end of the last car of the train may be connected to the adjacent testing device whereby such testing device will be connected in the entire brake pipe and signal pipe systems which lead respectively to the engineer's valve and signal in the cab of the engine. In other words, instead of closing the angle cocks in the brake pipe and signal pipe at the extreme rear end of the train to prevent the escape of air from such pipes, the hose couplings at the extreme rear end of the train are connected to the testing device and the angle cocks are left open to permit the testing device to be operated by air pressure in the train pipe and signal pipe so that if all the angle cocks are open throughout the train, the engineer may readily determine this fact by throwing the engineer's brake valve to full release, thereby causing the operation of the testing device which is connected in the brake pipe and signal pipe to allow the escape of air from the signal pipe for the purpose of operating the signal in the engineer's cab, thereby informing the engineer that the angle cocks throughout the train are all open or in position to permit the operation of all the brakes throughout the train. On the other hand, if any one of the angle cocks is closed at any point between the engine and rear car of the train when the engineer's valve is thrown to its full release position the signal will not operate, thereby indicating to the engineer that some one or more of the angle cocks are closed, this test being usually made before the train starts to afford opportunity for the trainman to locate and open the closed angle cock or cocks.

Other objects and uses relating to specific parts of the testing device will be brought out in the following description.

In the drawings—Figure 1 is an elevation of a portion of the brake pipe and signal pipe of an air brake system showing one of my improved testing devices as connected thereto. Fig. 2 is a longitudinal vertical sectional view of one of the testing devices. Fig. 3 is a sectional view of a portion of one side of the cylinder showing the vent opening therein.

In order to clearly illustrate my invention, I have shown a train-pipe —1— and signal pipe —2— as provided at each end with angle cocks —3— and —4— of the type usually employed in the Westinghouse air brake system, each valve having connected thereto a flexible hose —5— and coupling —6—.

The train pipe —1— and signal pipe —2— are connected in the usual manner to well known forms of engineer's valve —7— and signal —8— respectively, said engineer's valve and signal being located in the engineer's cab where they are readily accessible to the engineer.

In Fig. 1 I have shown the rear end of the rear car —A— of a train as provided with one of my improved testing devices comprising a cylinder —10—, a piston —11—, movable in the cylinder and provided with a piston rod —12— having one end projecting through a stuffing box or gland —13— and adapted to open a normally closed valve —14—. This valve —14— opens into an air chamber —15— to which is connected a flexible hose —16— which is similar and adapted to be coupled to the hose —5— of the signal pipe —2—. This valve —14— is normally held in its closed position by a spring —17— and is provided with a valve stem —18— guided in a suitable bushing —19— and provided with a lengthwise air passage —20— in one side thereof to allow the escape of air therethrough to the atmosphere when the valve —14— is opened, thereby causing the operation of the signal —8—. The opposite end of the cylinder —10— is provided with an air chamber —21— which communicates with the adjacent end of the cylinder —10— and is also connected to a flexible hose —22— which is similar and adapted to be connected to the hose coupling —5— of the brake pipe —1—.

The opposite ends of the cylinder —10— are closed by suitable heads —24— and —25— located at opposite ends of the piston —11—, the gland —13— being secured in the head —25—, while the opposite head —24— is provided with a chamber —21— and is connected with the flexible hose —22—.

The valve chamber —15— is formed within a suitable valve casing —26— which is secured to an extension —27— of the adjacent head —25— of the cylinder —10—, said extension being open at one side to the atmosphere to permit the escape of air through the channel —20— when the valve —14— is open.

The piston rod —12— and valve stem —18— are coaxial and their adjacent ends are normally spaced a slight distance apart just sufficient to assure the closing of the valve —14— by the spring —17— when the piston —11— is in its normal position, but by a slight inward movement of the piston under air pressure from the train pipe when the engineer's valve is thrown to its full release position, the end of the piston rod —12— engages and opens the valve —14— for a short time only, just long enough to cause the operation of the signal —8—, whereupon the piston is again restored to its normal position, allowing the valve —14— to be again closed by the spring —17—, the inward movement of the piston being limited by a stop sleeve —28— which encircles the connecting rod —12— between the inner end of the gland —13— and inner end of the piston —11—. This inner end of the piston —11— is of slightly greater diameter than the outer end so as to cause the restoration of the piston to its normal position when the air pressure at both ends is equal.

One side of the piston chamber is provided with a radial air port —29— normally closed by the outer end of the piston, but communicating with a lengthwise channel —30— in the adjacent side of the cylinder, which channel extends beyond the inner end of the piston and communicates with the interior of the cylinder through a permanently open port —31—.

Just at the outer end of the piston —11— is a permanently open port —32— in the side of the cylinder —10— and communicating with a lengthwise channel —33— which communicates with the interior of the cylinder —10— at the inner end of the piston —11— through a port —34— which is also permanently open.

A ball check valve —35— is located in the passage or channel —33— between the ports —32— and —34— and is normally held in its closed position by a spring —36—, said valve permitting the exit of air from the cylinder at the inner end of the piston but preventing the entrance of air thereto from the opposite end of the cylinder which communicates with the chamber —21—.

The cylinder —10— is provided with an inner annular groove —40— normally covered by the inner larger end of the piston —11— and communicating with a radial vent opening, as best seen in Fig. 3 so as to allow the exit of any compressed air which may leak around the piston at the outer end of the enlarged portion, thereby assuring the return of the piston to its starting position after opening the valve —14—.

This testing device is adapted to be used in connection with what is commonly known as the Westinghouse or any other well known similar air brake system in which air pressure is maintained in a train pipe and signal pipe, and such device may be readily applied to the ends of each car without in any way altering or interfering with the other parts of the system.

The effect of the operation of this testing device upon the signal is precisely the same as would be brought about by the operation of what is commonly known as the conductor's valve or any other valve by which the pressure in the signal pipe might be reduced. For example, assuming that the train pipe and signal pipe are connected in the usual manner to the engineer's valve and signal respectively, and that all of the angle cocks in such pipes are open and the ends of such pipes connected respectively to the air chamber —21— and valve chamber —15— of the testing cylinder —10—, then by manipulating the engineer's valve to admit air under—say 100 pounds—pressure into the train pipe, and also admitting air under—say 40 pounds—pressure into the signal pipe, the pressure in the train pipe which is connected to the air chamber —21— at the small end of the piston will force said piston away from the chamber —21— a sufficient distance to uncover the port —29— and cause the piston rod —12— to engage the valve stem —18— and open the valve —14—, thereby allowing a temporary discharge of the air under pressure from the signal pipe through the channel —20— to the atmosphere, causing the operation of the signal —8— and indicating to the engineer that all of the angle cocks in the train pipe are open ready for the application of the brakes when necessary. During this operation of the signal —8— the air under pressure at the small end of the piston passes through the open port —29—, passage —30— and port —31— into the cylinder —10— at the large end of the piston. The air pressure per unit of area is, therefore, the same upon the large end as upon the small end of the piston, thereby causing the return of said piston and its rod —12— to normal position again closing the port —29— and allowing the spring —17— to close the valve —14—, the testing device being now ready for a repetition of the test when desired.

In order to obviate any liability of leakage of the compressed air past the piston in either direction which would tend to balance the piston in its inoperative position, I provide a vent passage —40— in the cylinder preferably somewhere between the ends of the piston, such vent opening to atmosphere.

It is now apparent that the air pressure at both ends of the piston is the same and it is, therefore, necessary in all succeeding tests to produce a pressure in the train pipe somewhat in excess of that normally maintained therein in order to operate the piston —11—, such excess pressure being brought about by throwing the engineer's valve to full release position which is sometimes done to effect a more certain release of all of the brakes throughout the train.

When the engineer's valve is thrown to full release, the air pressure in the train pipe and in the cylinder at the small end of the piston is, therefore, increased—say 10 pounds—in excess of the pressure at the opposite end of the cylinder, or sufficient to move the piston from its normal position to open the valve —44— and permit a temporary discharge of air from the signal pipe through the open valve to the atmosphere. This movement of the piston allows the high pressure air through the channels —29—, —30— and —31— to enter the interior of the cylinder at the large end of the piston, which again returns the piston to its normal position, and the excess pressure in the cylinder at the large end of the piston, above what is normally maintained in the train pipe, is allowed to escape through the channels —34—, —33— and —32— to the small end of the piston, or into the train pipe, such excess pressure being sufficient to open the valve —35— against the action of the spring —36—.

The operation of my invention will now be readily understood upon reference to the foregoing description, and although I have shown a specific mechanism for carrying out the object stated, any device operated by air pressure controlled from the engine for creating a leakage or discharge of air from the signal pipe is within the scope of my invention.

What I claim is—

1. In a testing device for air brake systems in combination with a train pipe and signal pipe, both containing air under pressure, a valve port communicating with atmosphere and connected with the signal pipe, a normally closed valve for the port, and means actuated by air pressure from the brake pipe for opening said valve said means comprising a cylinder and a piston movable in the cylinder and having its inner end larger than its outer end, and a by-pass from the cylinder around the piston.

2. In a testing device for air brake systems, a train pipe and a signal pipe, both containing air under pressure, a valve chamber connected to the signal pipe and provided with a port communicating with the atmosphere, a normally closed valve for said port, and self-restoring means actuated by the air pressure in the train pipe for opening said valve said means comprising a cylinder and a piston movable in the cylinder and having its inner end larger than its outer end, and a by-pass from the cylinder around the piston.

3. In combination with the train pipe, signal pipe, engineer's valve, signal and angle cocks of an air brake system in which compressed air is normally maintained in the brake pipe and signal pipe, means on the rear end of the train actuated by air pressure from one of said pipes and controlled by the engineer's valve for operating the signal when all the angle cocks in the train pipe are open said means comprising a cylinder and a piston movable in the cylinder and having its inner end larger than its outer end, and a by-pass from the cylinder around the piston.

4. In combination with a train pipe, signal pipe, engineer's valve, signal and angle cocks of an air brake system in which air under pressure above atmosphere is normally maintained in the train pipe and signal pipe, mechanism controlled by air pressure in the train pipe for causing the discharge of air from the signal pipe and thereby operating the signal when the angle cocks in the train pipe are open said means comprising a cylinder and a piston movable in the cylinder and having its inner end larger than its outer end, and a by-pass from the cylinder around the piston.

5. In combination with the brake pipe and signal pipe of an air brake system in which compressed air is normally maintained in the brake pipe and signal pipe, self-restoring mechanism operated by air pressure from the train pipe for opening communication between the signal pipe and the atmosphere said means comprising a cylinder and a piston movable in the cylinder and having its inner end larger than its outer end, and a by-pass from the cylinder around the piston.

6. In combination with the train pipe and signal pipe of an air brake system in which compressed air is normally maintained in said pipes, a cylinder connected to the train pipe, a piston movable in the cylinder and actuated in one direction by air pressure from the train pipe a by-pass communicating with the interior of the cylinder at opposite ends of the piston, a valve chamber connected to the signal pipe and provided with a port communicating with atmosphere, a normally closed self-closing valve for said port, and means actuated by the piston for opening said valve.

7. In combination with the train pipe and signal pipe of an air brake system in which compressed air is normally maintained in said pipes, a cylinder, a piston movable in the cylinder, said cylinder being connected to the train pipe at one end of the piston and provided with a by-pass having one end normally closed by one end of the piston and its other end extending beyond the opposite end of the piston, the piston being operated by compressed air from the train pipe to uncover the normally closed end of the by-pass and allow the compressed air to enter the cylinder at the inner end of the piston, said inner end of the piston being larger than its outer end, whereby the air pressure at the larger end returns the piston to its normal position, a valve chamber connected to the signal pipe and provided with a port opening to the atmosphere, a normally closed self-closing valve for said air port, and means actuated by the piston for opening said valve and thereby permitting the discharge of air from the signal pipe for operating the signal.

8. In a testing device for air brake systems in combination with a train pipe and signal pipe, a cylinder having an inlet connected to the train pipe, a piston movable in the cylinder and having one end smaller than the other and facing the inlet, a valve chamber having an inlet connected to the signal pipe and also provided with an outlet communicating with the atmosphere, a normally closed valve for the outlet, and means actuated by the piston for opening said valve.

9. In a testing device for air brake systems in combination with a train pipe and a signal pipe, a cylinder having an inlet connected to the rear terminal end of the train pipe, a piston movable in the cylinder and actuated by air pressure from the train pipe, a by-pass communicating with the interior of the cylinder at opposite ends of the piston and having one end normally closed by said piston, said piston having one end smaller than the other and facing the inlet for the train pipe, a valve chamber connected to the signal pipe and provided with an outlet opening to the atmosphere, a normally closed valve for said outlet, and means actuated by the piston for opening said valve.

In witness whereof I have hereunto set my hand this 25th day of May, 1909.

FRED A. GILFUS.

Witnesses:
H. E. CHASE,
HOWARD P. DENISON.